United States Patent [19]

Suzuki et al.

[11] Patent Number: 4,681,184
[45] Date of Patent: Jul. 21, 1987

[54] HYDRAULIC REACTION FORCE APPARATUS FOR POWER STEERING SYSTEM

[75] Inventors: Yoshio Suzuki; Hirotetu Sonoda; Hideo Yabe, all of Saitama, Japan

[73] Assignee: Jidosha Kiki Co., Ltd., Tokyo, Japan

[21] Appl. No.: 813,031

[22] Filed: Dec. 24, 1985

[30] Foreign Application Priority Data

Dec. 27, 1984 [JP] Japan .................. 59-274006

[51] Int. Cl.⁴ .......................................... B62D 5/08
[52] U.S. Cl. .................................. 180/141; 180/142; 60/434
[58] Field of Search ............... 180/132, 141, 143, 142; 60/434; 91/372

[56] References Cited

U.S. PATENT DOCUMENTS 4,119,172 10/1978 Yanagishima et al. ............. 180/141
4,154,317 5/1979 Nishikawa et al. .................. 180/143

FOREIGN PATENT DOCUMENTS 53-45571 12/1978 Japan .
55-22998 5/1980 Japan .
59-114159 7/1984 Japan .

Primary Examiner—John J. Love
Assistant Examiner—Donn McGiehan
Attorney, Agent, or Firm—Blakely, Sokoloff, Taylor & Zafman

[57] ABSTRACT

A hydraulic reaction force apparatus for a power steering system has a pump, a power cylinder, a control valve, a first variable orifice, a hydraulic reaction force chamber, and a spool valve. The spool valve has a supply port connected to the pump, a reaction port connected to the hydraulic reaction force chamber, a tank port connected to a tank and a second variable orifice controlled by a spool in the spool valve. The opening of the second variable orifice is changed by a displacement of the spool caused by the pressure difference between upstream and downstream pressures of the first variable orifice, thereby connecting the reaction port to the supply port and the tank port and controlling the magnitude of the hydraulic reaction force.

5 Claims, 12 Drawing Figures

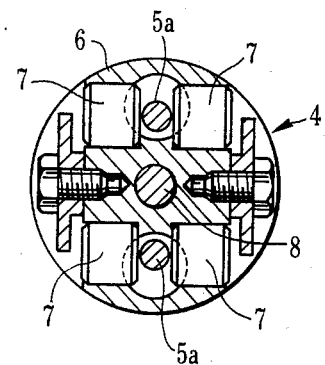
F I G. 6 A
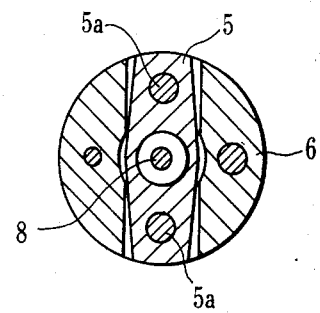
F I G. 6 B
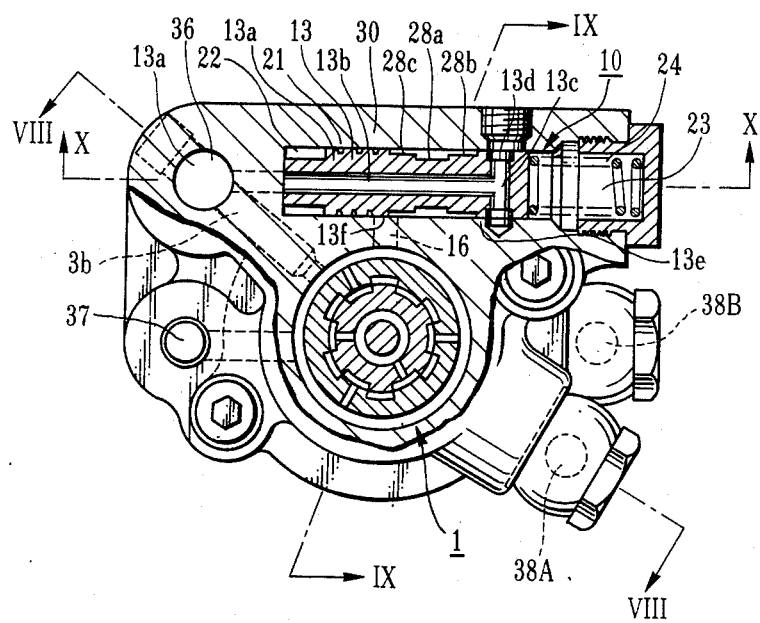
F I G. 7 ns of the driver. In
HYDRAULIC REACTION FORCE APPARATUS FOR POWER STEERING SYSTEM

BACKGROUND OF THE INVENTION

The present invention relates to an improvement in a hydraulic reaction force apparatus for providing an optimal steering force corresponding to detected vehicle velocity and steering angle in a power steering system.

Power steering systems have been widespread and installed in various types of vehicles including small cars in recent years. In such a conventional power steering system, an auxiliary power steering force can reduce the driver's steering force to achieve smooth operation and reduce driver's fatigue. There have been provided various types of conventional power steering systems.

Demand has arisen for optimally controlling a conventional power steering system in accordance with various traveling conditions, let alone a steering force matching with steering operation of the driver and a steering angle, so as to provide an optimal auxiliary power steering force. In a vehicle employing a power steering system of this type, a large auxiliary power steering force must be generated for steering during parking (i.e., a stationary swing) or steering during low-velocity traveling to achieve light and smooth steering. However, when such a large auxiliary power steering force is produced during high-velocity traveling, the driver's steering force of the steering wheel is excessively decreased to cause anxiety of the driver. In practice, such a power steering system is not preferable to optimize driving feelings. Therefore, while the vehicle is traveling at a high velocity, the auxiliary power steering force is decreased to load the steering wheel, i.e., to increase a driver's steering force, thereby guaranteeing stability of straight traveling at a high speed.

In order to decrease the power steering force which occurs in vehicles traveling at a high velocity to load the steering wheel, (i.e. to increase a drivers steering force), a conventional hydraulic reaction force apparatus is adapted to apply an optimal steering reaction force to the steering wheel and control stiffness (i.e., steering reaction force) of the steering wheel at high and low vehicle velocities, as described in Japanese Patent Disclosure No. 59-114159. In the hydraulic reaction force apparatus, a pressure control valve is disposed midway along a branch path which is branched from a hydraulic path for connecting a pump and a selector valve and which is connected to a hydraulic reaction force chamber of the selector valve. The opening of the pressure control valve is controlled by a pilot pressure, so that one end of a pilot pressure control valve is connected to the branch path through an orifice and the other end thereof is connected to a low-pressure path connected to the tank. Such a conventional structure is effective to some extent in reaction force hydraulic control for the hydraulic reaction force chamber to perform steering force control in response to the vehicle traveling conditions.

However, in the conventional hydraulic reaction force apparatus as described above, a pressure of the oil supplied to the hydraulic reaction force chamber must be controlled, so that a pressure control valve and a pilot pressure control valve therefor are required. The number of constituting members is increased, and piping is cumbersome. As a result, the overall structure is complicated and the apparatus as a whole is bulky.

Furthermore, the response characteristics of the conventional hydraulic reaction force apparatus are poor in the above-mentioned steering force control. In particular, in order to perform fine adjustment and improve the response characteristics, demand has arisen for a simple implementation which provides good response characteristics and guarantees optimal steering force control.

In the hydraulic reaction force apparatus, therefore, the steering reaction force must be optimally controlled in accordance with the vehicle traveling conditions such as a vehicle velocity and a steering angle so as to provide optimal driving feelings.

SUMMARY OF THE INVENTION

It is a principal object of the present invention to provide a hydraulic reaction force apparatus which has a simple structure and low cost.

It is another object of the present invention to provide a hydraulic reaction force apparatus which can adjust a hydraulic pressure acting on a hydraulic reaction force chamber in an analog manner to achieve steering reaction force control matching with actual traveling conditions.

It is still another object of the present invention to provide a compact hydraulic reaction force apparatus which has a small number of constituting members and which can be built into a power steering system.

In order to achieve the above object of the present invention, there is provided a hydraulic reaction force apparatus for a power steering system which includes a pump, a power cylinder for supplying an auxiliary steering force to a steering wheel, and a control valve for switching a hydraulic path from the pump to the power cylinder in accordance with a steering direction of the steering wheel. A first variable orifice is arranged between the pump and the control valve. The first variable orifice is arranged such that an opening thereof is controlled by a solenoid driven in response to a current supplied to the solenoid in accordance with operation conditions of a vehicle. A hydraulic reaction force chamber, formed between an input member rotated by the steering wheel and an output member interlocked with vehicle wheels, supplies a reaction force corresponding to a hydraulic pressure applied to the power cylinder so as to restrict rotation of the input member. A spool valve is arranged between the pump and the hydraulic reaction force chamber and has a spool which moves in accordance with a pressure difference caused by the first variable orifice. The spool valve is provided with a supply port connected to the pump, a reaction port connected to the hydraulic reaction force chamber, a tank port connected to a tank and a second variable orifice controlled by the spool. The second variable orifice is adapted such that an opening thereof is changed by a displacement of the spool caused by the pressure difference between upstream and downstream pressures of the first variable orifice, thereby connecting the reaction port to the supply port and the tank port and controlling a magnitude of the hydraulic reaction force.

BRIEF DESCRIPTION OF THE DRAWINGS

FIGS. 6A and 6B are sectional views showing the structure taken along the lines VIa—VIa and VIb—VIb of FIG. 5, respectively;

FIG. 7 is a sectional view of the structure taken along the line VII—VII of FIG. 5.

DESCRIPTION OF THE PREFERRED EMBODIMENT

A hydraulic reaction force apparatus according to an embodiment of the present invention will be described in detail with reference to the accompanying drawings.

Figure 1:
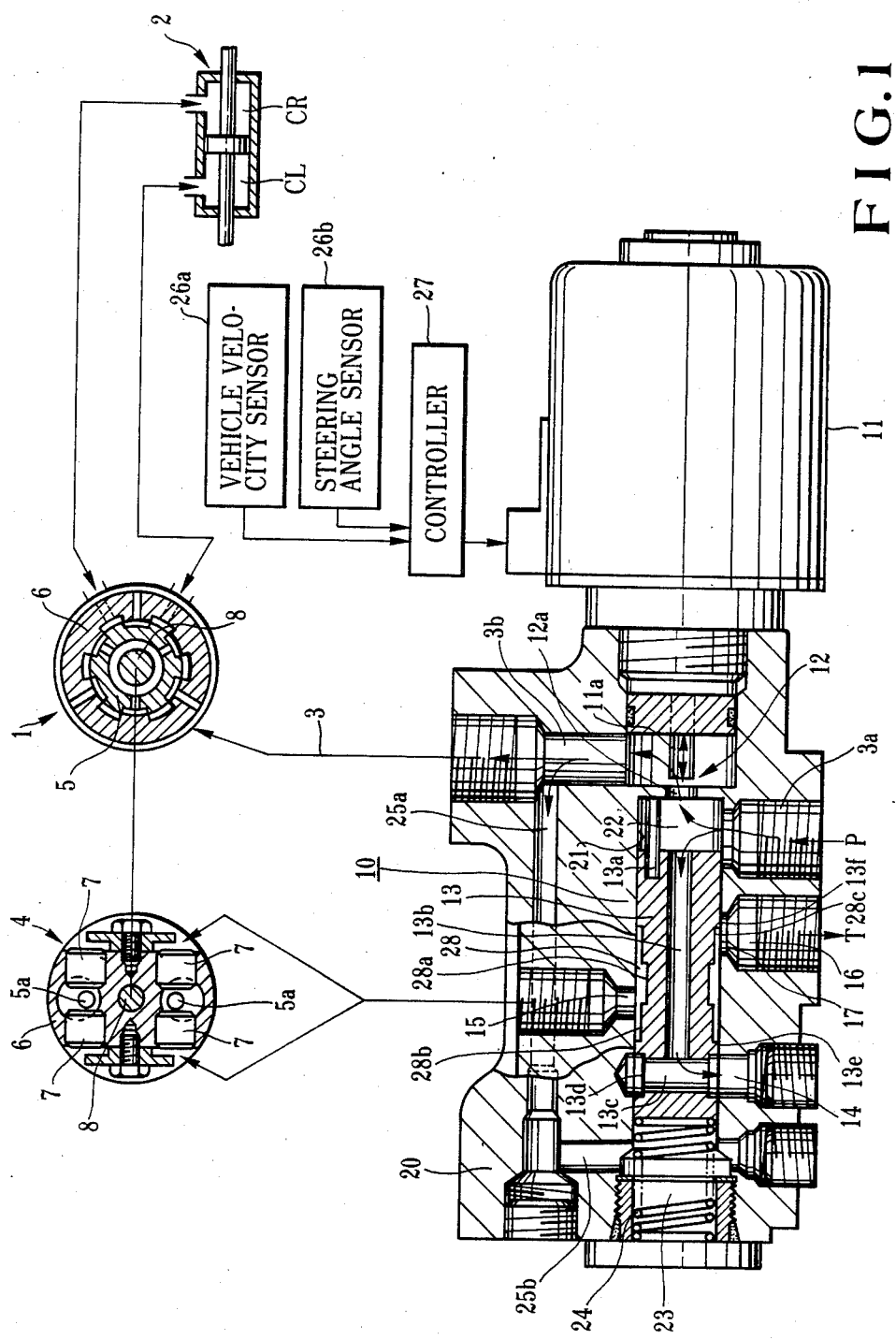
FIG. 1 is a schematic diagram showing an enlarged main part of a hydraulic reaction force apparatus for a power steering system according to an embodiment of the present invention.

FIG. 1 shows the hydraulic reaction force apparatus for a power steering system according to the embodiment of the present invention. Referring to FIG. 1, reference numeral 1 denotes a rotary flow selector valve constituting a power steering system; and 2, a power cylinder for producing an auxiliary power steering force in a forward direction for supplying oil under a compression. The power cylinder 2 has right and left chambers which are selectively connected to a hydraulic path 3 to a pump P upon operation of the flow selector valve 1. The construction of the power cylinder is known to those skilled in the art, and a detailed description thereof will be omitted.

Reference numeral 4 denotes a hydraulic reaction force chamber constituting the hydraulic reaction force apparatus. In the hydraulic reaction chamber 4 of the preferred embodiment of the present invention, shown in FIG. 1, two pairs of plungers 7 are inserted between input and output members 5 and 6 in order to stop rotation of the input member 5 by urging it against the pins 5a. Oil under compression is supplied from the pump P to the hydraulic reaction force chamber 4 through a hydraulic reaction force control spool valve 10. Reference numeral 8 denotes a torsion bar coupled between the input and output members 5 and 6 of the flow selector valve 1 so as to allow relative movement between the input and output members 5 and 6 within a predetermined range.

The hydraulic reaction force control spool valve 10 as the main feature of the present invention has the following construction. The spool valve 10 has a spool 13 arranged in the hydraulic path 3 (i.e., 3a and 3b) for coupling the pump P to the power cylinder 2. The spool 13 is slid by a different between upstream and downstream pressures of a variable orifice 12. The opening of the variable orifice 12 is controlled by a solenoid 11 driven by a supply current with a magnitude corresponding to the traveling conditions of the vehicle. Upon movement of the spool 13, a supply port 14 for receiving compressed oil from the hydraulic path 3 communicates with a reaction port 15 of the hydraulic reaction force chamber 4. A variable orifice portion 17 formed between a flow path between the ports 14 and 15 and a return port 16 connected to a tank T is controlled.

More particularly, the spool valve 10 has the spool 13 slidably fitted in a valve hole 21 formed in a valve body 20. A communication hole 3a is formed at a portion of a high-pressure chamber 22 formed at one end of the spool 13. The hydraulic path 3 is selectively coupled from the pump P constituting the power steering system to the right or left chamber of the power cylinder 2 through the flow selector valve 1. The high-pressure chamber 22 in the valve hole 21 supplies compressed oil from the pump P to the flow selector valve 1 through a hole 12a and then a communication hole 3b. The hole 12a is axially formed at one end of the high-pressure chamber 22, and the hole 3b is formed in a lateral relationship with the hole 12a constituting part of the hydraulic path 3. The solenoid 11 is located proximate to the hole 12a. Solenoid 11 includes a rod 11a which is aligned with the hole 12a such that rod 11a can be inserted into or retracted from the hole 12a. The rod 11a of the solenoid 11 and the hole 12a constitute the variable orifice 12.

A return spring 24 is arranged at the other end of the spool 13 constituting the spool valve 10 to always bias the spool 13 toward the high-pressure chamber 22. Compressed oil at the downstream of the variable orifice 12 is supplied to a low-pressure chamber 23 through communication holes 25a and 25b. Reference numeral 13a denotes a stopper extending on the spool 13. Reference numerals 13b and 13c denote communication holes formed in the spool 13 to extend in the axial direction and a direction perpendicular thereto from the high-pressure chamber 22. The communication hole 13c communicates with an annular groove 13d formed on the outer surface portion of the spool 13 near the low-pressure chamber 23. The hole 13c is also connected to a communication hole serving as the supply port formed extending from the side of the body 20 through the valve hole 21, so that the compressed oil from the pump P can be supplied to the supply port 14. However, the compressed oil may be supplied to the supply port 14 from an open end of the communication hole 13c via another pipe, although the communication hole 13c is closed by a blind plug in this embodiment).

A controller 27 is connected to the solenoid 11 to supply a current with a magnitude corresponding to the traveling conditions determined by detection signals from a vehicle velocity sensor 26a and a steering angle sensor 26b. The rod 11a reciprocates by a predetermined distance with respect to the hole 12a in response to the current from the controller 27. Therefore, the variable orifice 12 is controlled to have a desired opening.

The following function of the structure described above should be noted. A stepped annular groove 28 is constituted by a central small-diameter portion 28a of the spool 1 and end large-diameter portions 28b and 28c of the spool 13. The reaction port 15 can communicate through the stepped annular groove 28 with the supply port 14 or the return port 16 which is located at each side opposite of the reaction port 15.

Figure 2A:
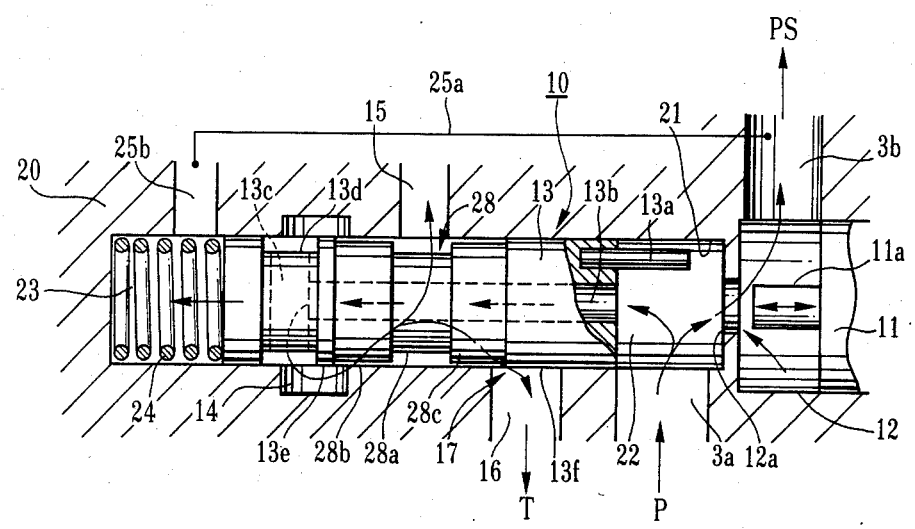
FIGS. 2A and 2B are respectively schematic sectional views for explaining the operation states of a hydraulic reaction force control spool valve as the main feature of the apparatus of FIG. 1.
Figure 2B:
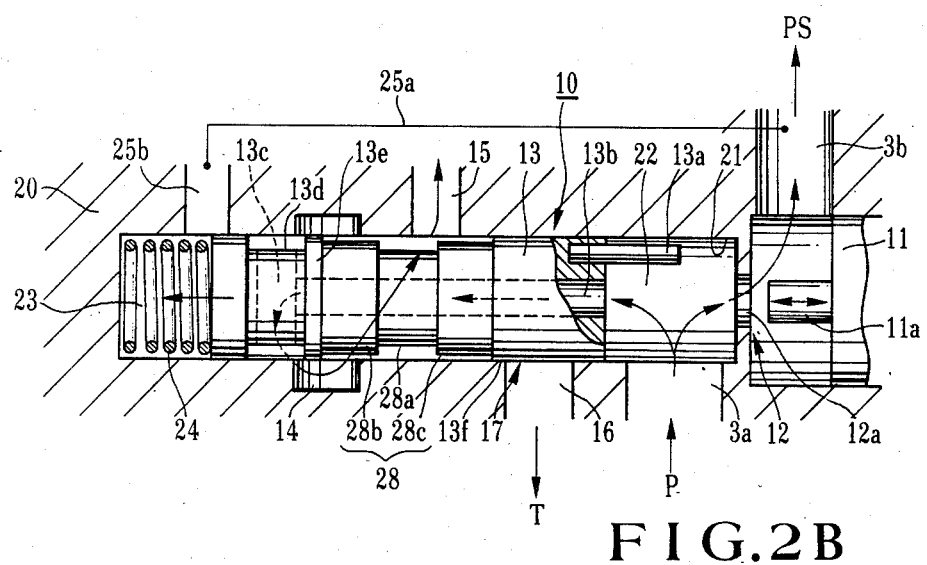

In the spool valve 10 having the structure described above, when the spool 13 is moved to the left within the valve hole 21 due to a pressure difference defined by the opening of the variable orifice 12, the supply port 14 is coupled to the left large-diameter portion 28b of the stepped annular groove 28 through a land 13e, as shown in FIG. 2A. The supply port 14 supplies a predetermined amount of compressed oil from the reaction port 15 opposing the small-diameter portion 28a to the hydraulic reaction force chamber 4 through a flow path defined by a gap between the large-diameter portion 28b and the valve hole 21. Therefore, a steering reaction force proportional to a displacement of the spool 13 is generated. As described above, when the spool 13 is moved, the return port 16 normally opposing the right large-diameter portion 28c of the stepped annular groove 28 is partitioned by the land 13e of the spool 13 in proportion to the displacement of the spool 13, and the opening of the variable orifice portion 17 formed in the partitioned portion is gradually decreased. The hydraulic pressure from the supply port 14 to the reaction port 15 is gradually increased, as is apparent from the above description. As shown in FIG. 2B, when the spool 13 is moved to the left by a maximum displacement and the variable orifice portion 17 is blocked, a maximum steering reaction force can be obtained by directly coupling the supply port 14 to the reaction port 15.

The reason why the hydraulic pressure from the supply port 14 is controlled in accordance with the degree of the opening of the variable orifice portion 17 at the side of the return port 16 and is supplied to the reaction port 15 can be readily understood from the fact that the gap between the valve hole 21 and the large-diameter portions 28b and 28c of the stepped annular groove 28 is small and a compressed oil flow can be controlled by the length of these portions 28b and 28c.

When a current flowing through the solenoid 11 is decreased and the variable orifice 12 is opened to decrease a difference between the upstream pressure and the downstream pressure of the variable orifice 12, the spool 13 is moved to the right by a biasing force of the spring 24 to a degree corresponding to the pressure difference, thereby controlling the hydraulic reaction force. When the pressure difference is substantially minimized, the spool 13 returns to the initial position.

Figure 3:
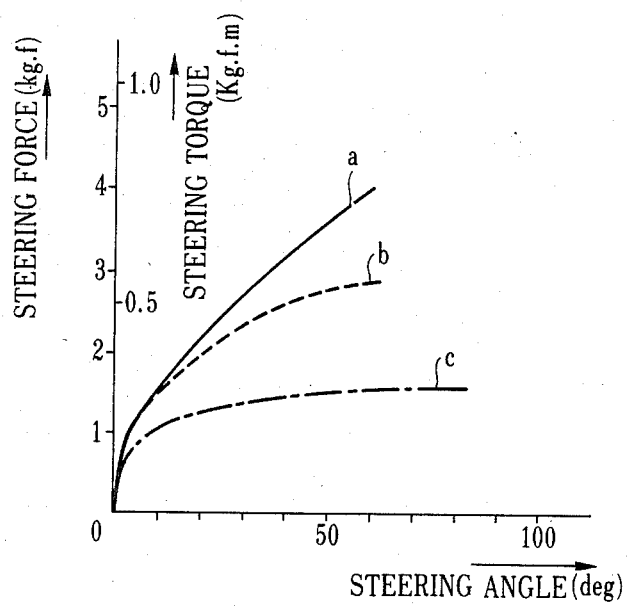
FIG. 3 is a graph showing the steering force as a function of steering angle so as to explain a hydraulic reaction force control state.

According to the hydraulic reaction force apparatus for the power steering system, as described above, a current corresponding to the vehicle velocity and the steering angle flows in the solenoid 11 to obtain the steering force characteristics shown in FIG. 3. Characteristic curve a represents steering reaction force control in accordance with vehicle velocity and steering angle when the vehicle velocity is given as 80 km/h; characteristic curve b represents steering reaction force control in accordance with only vehicle velocity; and characteristic curve c represents the case without steering reaction force control. The effect of steering reaction force control according to this embodiment can be apparent from these characteristic curves.

Figure 4:
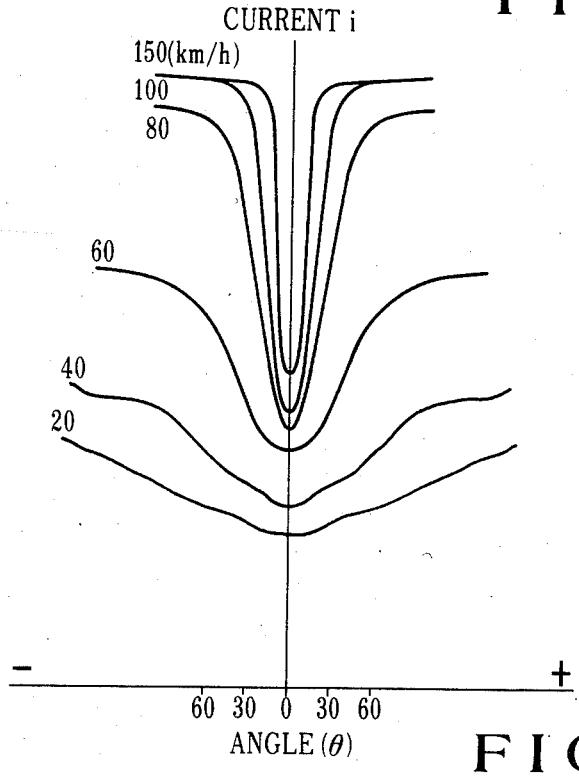
FIG. 4 is a graph showing the vehicle velocity as a function of steering angle so as to explain the hydraulic reaction force control state.
Figure 5:
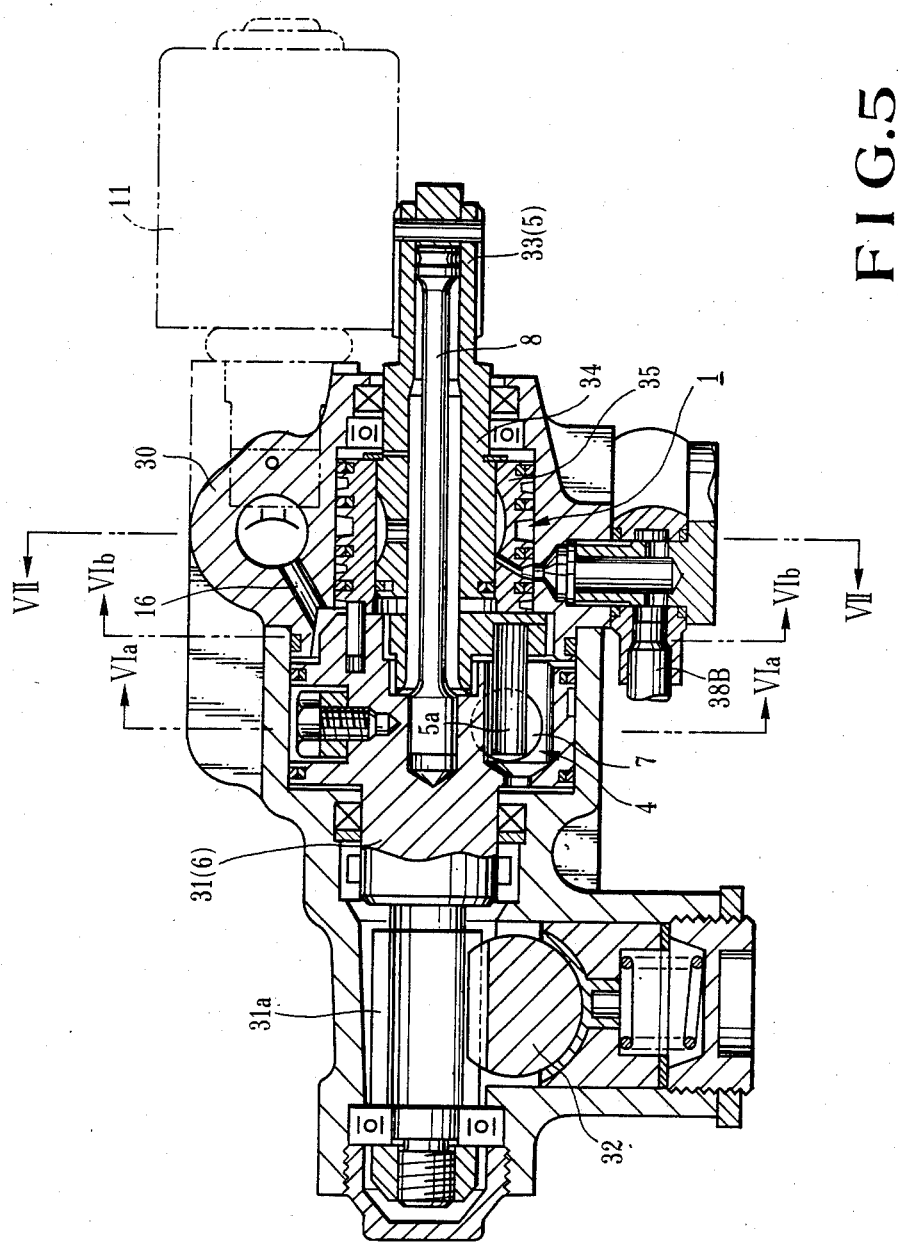
FIG. 5 is a schematic longitudinal sectional view of the spool valve in tandem with a flow path selector valve steering body.
Figure 8:
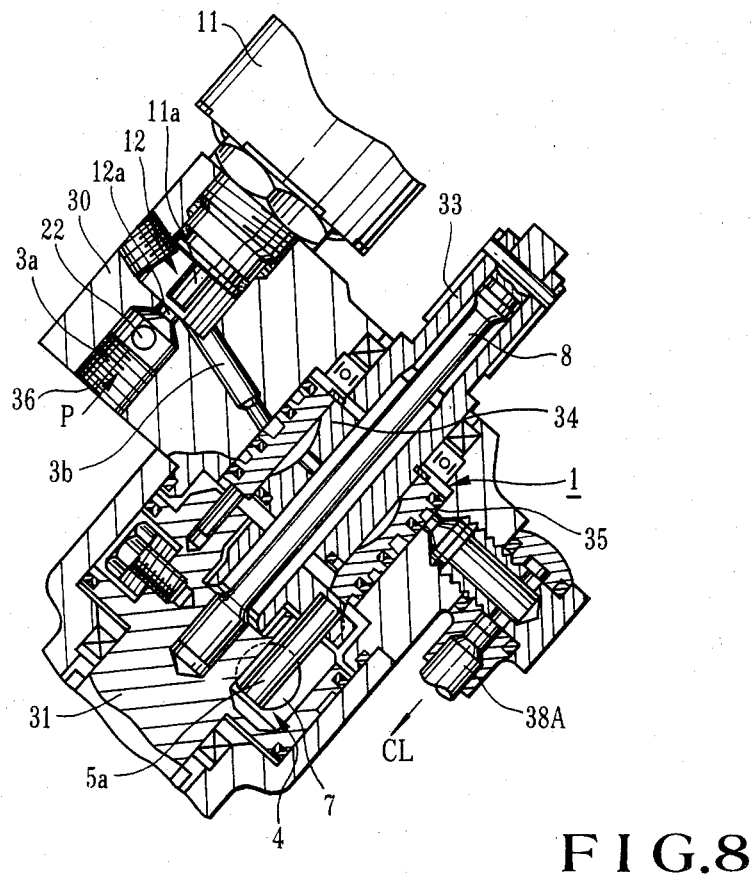
FIGS. 8, 9 & 10 are sectional views showing the structure taken along the lines VIII—VIII and X—X of FIG. 7, respectively.
Figure 9:
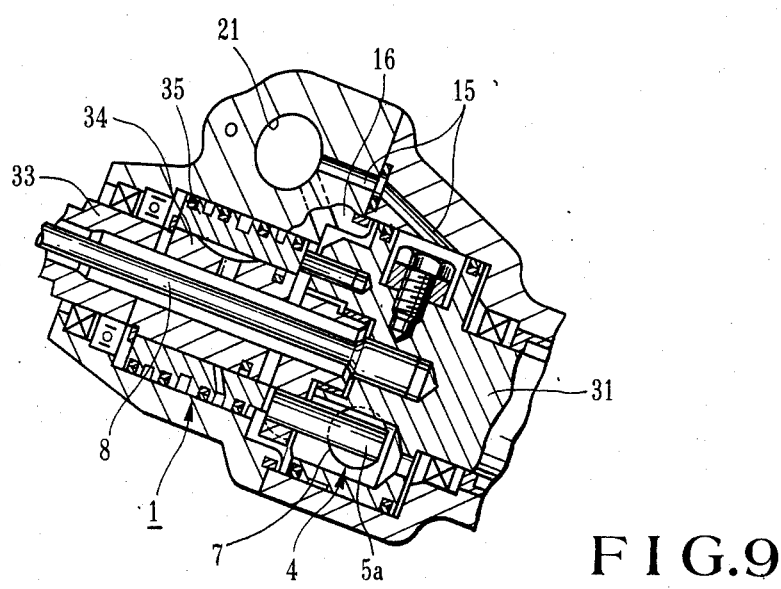
Figure 10:
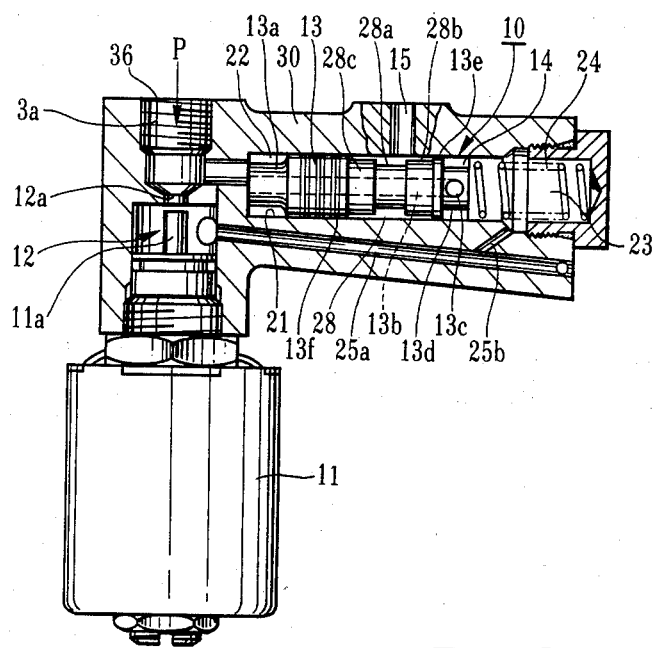

FIG. 4 is a graph showing supply current magnitudes as a function of steering angles when vehicle velocity is used as a parameter. Steering reaction force control can be optimally performed by the controller 27.

FIGS. 5 to 10 show a structure wherein a hydraulic reaction force control spool valve 10 as a main feature of the hydraulic reaction force apparatus described above is integrally mounted with a steering body 30 constituting a rotary flow path selector valve 1 in the power steering system. The same reference numerals used throughout FIGS. 5 to 10 denote the same parts. The same reference numerals as in FIG. 1 denote the same parts as in FIGS. 5 to 10, and a detailed description thereof will be omitted.

The construction of the power steering system will be briefly described. Reference numeral 31 denotes a valve output pinion shaft with a pinion 31a meshed with a rack 32, which together constitute a steering link mechanism; 33, an input shaft which is coaxially mounted to the right end of the pinion shaft 3 through a torsion bar 8 and the right end of which is coupled to a steering wheel (not shown). The shafts 31 and 33 can be properly rotated in accordance with the steering angle. A rotor 34 and a sleeve 35 which constitute the flow path selector valve 1 are integrally mounted with the shafts 31 and 33 inside the body 30. The rotor 34 and the sleeve 35 change the flow path between the side of a pump P and a tank T and the side between right and left cylinder chambers CR and CL of the power cylinder 2. A fail safe mechanism is arranged between the input rotor 34 and the output sleeve 35 to swing by a predetermined angle. Reference numerals 36 and 37 denote a suction port for receiving compressed coil from the pump P and a return port for returning the compressed oil to the oil tank T. Reference numerals 38A and 38B denote left and right drain ports connected to the left and right cylinder chambers CL and CR of the power cylinder 2, respectively. The construction and operation of the power steering system with such a rotary flow path selector valve 1 are known to those skilled in the art, and a detailed description thereof will be omitted.

The spool valve 10 is mounted together with the steering body 30 in a direction substantially perpendicular to the flow path selector valve 1. At the same time, the solenoid 11 is perpendicular to the spool valve 10 and is parallel to the flow path selector valve 1. Therefore, the spool valve 10 can be easily and properly coupled to the flow path selector valve 1, and a compact structure can be obtained. Details of the structure can be readily understood.

According to the hydraulic reaction force apparatus for the power steering system according to the present invention, the simple and inexpensive hydraulic reaction force spool valve 10 is used to easily and properly control the hydraulic pressure of the hydraulic reaction force chamber 4, thereby providing an optimal steering reaction force. When the vehicle is traveling at a low velocity, compressed oil is not supplied to the hydraulic reaction force chamber 4. In this case, the steering force is the same (small) as that of the conventional power steering system for torsion force of the torsion bar 8. However, when the vehicle is traveling at a high velocity, compressed oil is adjusted in accordance with detected vehicle velocity and steering angle, thereby guaranteeing stable steering with an optimal steering reaction force.

The present invention is not limited to the embodiment described above. Various changes and modification for the shape of respective members and structure can be made within the spirit and scope of the present invention. In the above embodiment, the basic structure of the spool valve 10 is exemplified in FIG. 1. However, its structure is not limited to the illustrated one. For example, the positional relationship between the ports, the stepped annular groove and the land may be modified as needed.

Furthermore, in the above embodiment, the hydraulic reaction force apparatus is of a type which has a plunger type reaction force chamber 4, and the power steering system is of a rack-and-pinion type. However, the reaction chamber can be constituted by a chamber utilizing a ball or the like. The power steering system is not limited to the rack-and-pinion type, but can be extended to a system using a ballscrew or the like.

According to the hydraulic reaction force apparatus for the power steering system of the present invention, the hydraulic reaction force control spool valve is arranged in the hydraulic path extending from the pump to the power cylinder. The spool valve is slidably operated by a pressure difference between the upstream side and the downstream side of the variable orifice the opening of which is controlled by a solenoid driven by a current corresponding to the vehicle traveling conditions. Upon slidable action, the supply port for receiving compressed oil from the hydraulic path is coupled to the reaction port extending to the hydraulic reaction force chamber. At the same time, the variable orifice portion formed between the flow path between the supply port and the reaction port and the return port connected to the tank is controlled. Therefore, pressure of compressed oil supplied to the hydraulic reaction force chamber can be adjusted with a simple and inexpensive structure in an analog manner. As a result, steering reaction force control can be properly and accurately performed in accordance with various traveling conditions. Furthermore, the hydraulic reaction force apparatus is simple as a whole, has only a small number of components, and can be integrally mounted with the power steering system, thereby decreasing the cost and the overall size.

What is claimed is:

1. A hydraulic reaction force apparatus for a power steering system of a vehicle, comprising:
   a pump;
   a power cylinder for supplying an auxiliary steering force to a steering wheel;
   a control valve for switching a hydraulic path from said pump to said power cylinder in accordance with a steering direction of said steering wheel;
   a solenoid driven in response to a variable current, said current corresponding to operation conditions of the vehicle;
   a first variable orifice arranged between said pump and said control valve, said first variable orifice having a first opening, said first opening being controlled by said solenoid in accordance with said operation conditions of said vehicle;
   a hydraulic reaction force chamber, said hydraulic reaction force chamber being disposed between an input member rotated by said steering wheel and an output member interlocked with the wheels of the vehicle, said reaction force chamber supplying, as a reaction force, a pressure corresponding to a hydraulic pressure applied to said power cylinder thereby restricting rotation of said input member; and
   a spool valve disposed between said pump and said hydraulic reaction force chamber, said spool valve having a spool, said spool being moveable in accordance with a pressure difference between upstream and downstream pressures of said first variable orifice, said spool valve also having a supply port coupled to said pump, a reaction port coupled to said hydraulic reaction force chamber, a tank port coupled to a tank and a second variable orifice controlled by said spool, said second variable orifice having a second opening which is adapted to be changed as said spool moves in accordance with said pressure difference, thereby connecting said reaction port to said supply port and said tank port and controlling a magnitude of said hydraulic reaction force.

2. An apparatus according to claim 1, wherein said spool valve is formed integrally with said first variable orifice to constitute an integral assembly.

3. An apparatus according to claim 2, wherein said hydraulic reaction force chamber and said control valve are formed integrally with said integral assembly.

4. An apparatus according to claim 1, wherein said control valve is of a rotary type.

5. An apparatus according to claim 1, wherein a rod controlled by said solenoid is substantially perpendicular to said spool of said spool valve.

* * * * *